US007219066B2

(12) United States Patent
Parks et al.

(10) Patent No.: US 7,219,066 B2
(45) Date of Patent: May 15, 2007

(54) SKILLS MATCHING APPLICATION

(75) Inventors: Russell E. Parks, Marlboro, NY (US); Frank Davide, Monroe, NY (US); Allison M. McCormack, Hopewell Junction, NY (US); Jae K. Park, Ryebrook, NY (US); Gautam Majumdar, Danbury, CT (US)

(73) Assignee: International Business Machines Corporation, Armonk, NY (US)

( * ) Notice: Subject to any disclaimer, the term of this patent is extended or adjusted under 35 U.S.C. 154(b) by 704 days.

(21) Appl. No.: 09/759,016

(22) Filed: Jan. 12, 2001

(65) Prior Publication Data
US 2002/0095300 A1 Jul. 18, 2002

(51) Int. Cl.
*G06Q 99/00* (2006.01)
(52) U.S. Cl. .............................................. 705/1; 705/9
(58) Field of Classification Search .................... 705/1, 705/9
See application file for complete search history.

(56) References Cited

U.S. PATENT DOCUMENTS 5,117,353 A * 5/1992 Stipanovich et al. .......... 705/11

(Continued)

FOREIGN PATENT DOCUMENTS

JP 11338881 A * 12/1999

(Continued)

OTHER PUBLICATIONS

"IntelliMatch: I-Net Selects IntelliMatch for Electronic Recruitment of Prospective Employees; Outsourcer to Use IntelliMatch Software to Build Skills Database," Business Wire, May 9, 1995.*

(Continued)

*Primary Examiner*—Jonathan Ouellette
(74) *Attorney, Agent, or Firm*—Whitman, Curtis, Christofferson & Cook, PC; James J. Cioffi

(57) ABSTRACT

A tool, called the Skills Matching Application (SMA), allows a user, such as a hiring manager, to communicate requirements to technical service suppliers in a way that significantly reduces the process time and improves the accuracy of requests sent to suppliers. The SMA is accessed from a Web-based Requisition/Catalog (REQ/CAT) Web application. A user who needs to request a technical contractor accesses the REQ/CAT Web application which brings the user to the SMA Web site. The SMA application, after requiring a password and profile (for first time access) to be entered, takes the user through a series of screens which prompts the user to enter a Statement of Work (SOW) and complete a skills detail checklist for each of the technical skills requested. Once the request is completed, it is submitted to contracted suppliers who are sent an e-mail notification notifying the supplier that a new request has been entered into the SMA application for them to review and submit a candidate against. This e-mail has a standard formatted attachment which contains the statement of work and skills detail checklist. The suppliers, when they receive an e-mail request, access the Web site database to view the request details. A supplier provides a candidate or candidates by accessing the SMA Web site and submitting candidates and appending resumes as appropriate. The supplier provides a response to the SOW by responding to the entries with the candidate's skills, experience, etc. The requestor views the supplier responses and associated resumes and can either accept or reject each candidate submitted but cannot accept more than the number of candidates requested.

18 Claims, 2 Drawing Sheets

U.S. PATENT DOCUMENTS

| | | | |
|---|---|---|---|
| 5,576,951 A | 11/1996 | Lockwood | |
| 5,862,223 A | 1/1999 | Walker et al. | |
| 6,049,776 A * | 4/2000 | Donnelly et al. | 705/8 |
| 6,249,282 B1 * | 6/2001 | Sutcliffe et al. | 345/751 |
| 6,266,659 B1 * | 7/2001 | Nadkarni | 707/3 |
| 6,272,467 B1 * | 8/2001 | Durand et al. | 705/1 |
| 6,289,340 B1 * | 9/2001 | Puram et al. | 707/5 |
| 6,370,510 B1 * | 4/2002 | McGovern et al. | 705/1 |
| 6,385,620 B1 * | 5/2002 | Kurzius et al. | 707/104.1 |
| 6,408,337 B1 * | 6/2002 | Dietz et al. | 709/229 |
| 6,675,151 B1 * | 1/2004 | Thompson et al. | 705/9 |
| 2001/0034630 A1 * | 10/2001 | Mayer et al. | 705/7 |
| 2001/0039508 A1 * | 11/2001 | Nagler et al. | 705/11 |
| 2001/0042000 A1 * | 11/2001 | Defoor, Jr. | 705/9 |
| 2001/0042038 A1 * | 11/2001 | Phatak | 705/37 |
| 2002/0026452 A1 * | 2/2002 | Baumgarten et al. | 707/104.1 |
| 2002/0046074 A1 * | 4/2002 | Barton | 705/8 |
| 2002/0055870 A1 * | 5/2002 | Thomas | 705/10 |
| 2002/0072946 A1 * | 6/2002 | Richardson | 705/8 |
| 2002/0111958 A1 * | 8/2002 | Hartman et al. | 707/200 |
| 2002/0152316 A1 * | 10/2002 | Dietz et al. | 709/229 |
| 2003/0009437 A1 * | 1/2003 | Seiler et al. | 707/1 |
| 2005/0010467 A1 * | 1/2005 | Dietz et al. | 705/9 |

FOREIGN PATENT DOCUMENTS

JP        2000057213 A    *    2/2000

OTHER PUBLICATIONS

"zRep Launches First B2B Skills Scoring Application for Internet-Enabled Technology Recruiting," Business Wire, Mar. 20, 2000.*

* cited by examiner

SKILLS MATCHING APPLICATION

BACKGROUND OF THE INVENTION

1. Field of the Invention

The present invention generally relates to procuring technical services from contractors and, more particularly, to a Web based skills matching application that facilitates the procurement process for technical services contractors.

2. Background Description

Considerable attention has been devoted to improving the methods used to procure components and hardware in manufacturing many products, including for example automobiles and computers. Recently, these processes have migrated to the Internet allowing for fast, efficient and cost-effective procurement from a variety of suppliers. However, the procurement of services, and especially technical services, has not received the same attention. The process is still a matter of advertising, using third party employment services and other intermediaries. Responses are slow and there is the possibility when working through third parties that requests are incomplete or inaccurate, resulting in responses that do not meet the requirements. Since the technical services required may be for an immediate although temporary need, some better way needs to be developed in order to timely respond to a specific need for technical services.

SUMMARY OF THE INVENTION

It is therefore an object of the present invention to provide a tool that allows a user, such as a hiring manager, to communicate requirements to technical service suppliers in a way that significantly reduces the process time and improves the accuracy of requests sent to suppliers.

According to the invention, there is provided a Skills Matching Application (SMA) which is accessed from a Requisition/Catalog (REQ/CAT) application, which may be either a Web-based application or a standalone application. A user who needs to request a technical contractor accesses the REQ/CAT application (or goes directly to the SMA Universal Resource Locator (URL)) which brings the user to the SMA Web site. The SMA application, after requiring a password and profile (for first time access) to be entered, takes the user through a series of screens which prompts the user to enter a Statement of Work (SOW) and complete a skills detail checklist for each of the technical skills requested. Some of the information required to be entered are the following:

a) type and skill required, i.e., programmer, network specialist, database administrator, etc.;
b) level of the skill;
c) proficiency level of specific operating systems, programming languages and tools required of the candidate;
d) work location, on-call, weekend work, experience required for position, etc.;
e) other related SOW information; and
f) file attachments can also be included.

Once the request is completed, it is submitted to contracted suppliers (individual contracted suppliers versus all contracted suppliers can be identified by the requester) who are sent an e-mail notification. The notification notifies the supplier that a new request has been entered into the SMA application for them to review and submit a candidate against. This e-mail has a standard formatted attachment which contains the statement of work and skills detail checklist. The SMA application has the capability to identify suppliers as primary, secondary, and so on for a skill and send the request immediately to the primary and, after a first predetermined number of days, to the secondary and, after a second predetermined number of days, to the next and so on. The requestor can cancel the request, and the SMA tool sends an e-mail to all suppliers who were sent the request. e-mail notifications are sent to suppliers when the requestor performs any action against the request and vice versa.

The suppliers, when they receive an e-mail request, access the Web site database to view the request details. Suppliers can also use the e-mail notifications and attachments to load into their local systems. Each supplier has the option of accessing the SMA Web site or generating and transmitting a batch interface to SMA to submit candidates and appending resumes as appropriate. The supplier provides a response to the SOW by responding to the entries with the candidate's skills, experience, etc. The supplier enters the candidate's name and wage (if different from the agreed to rate for that region or skill).

The requestor will receive an e-mail notification each time the supplier submits a candidate. The requester then accesses the SMA Web site and views the supplier responses and associated resumes and can either accept or reject each candidate submitted but cannot accept more than the number of candidates requested. Once the requester accepts the candidate(s), the request is considered closed and the request is archived after the next SMA batch process is complete. The requestor then submits the candidate(s) to the REQ/CAT Web site where it is assigned to a requisition. The requester then completes the requisition (i.e., adding travel and other related expenses, etc.) and then moves through the requisition approval process. When the SMA is used as a standalone application, the requester uses the tool to source the contractor requirement and then would go to the requisition system to complete the transaction.

Once the requisition is approved in the REQ/CAT Web site, it is sent on to SAP procurement system for conversion to a purchase order and transmission to a supplier. Status changes, i.e., submitted, pending, sent to REQ/CAT, and Approved (in REQ/CAT Web site), and purchase order (PO) number from SAP are reflected in the status field on the SMA database.

In addition to the process defined here, the SMA application supports a Renewal, Known Candidate and "Submit Requisition Directly to REQ/CAT Web" process. The renewal process is used to "renew" a technical subcontractor who is already working for the company. Known items are the candidate(s) name(s) and supplier. These requests are only sent to the supplier who is already providing the candidate(s). The Known Candidate function is used to send a request to a supplier for a candidate that has already been identified. The "Submit Requisition Directly to REQ/CAT Web" process is used when the requester knows the candidate(s) name(s), the supplier and the rate to be charged. These requests are not sent to suppliers; rather, the request when completed is sent directly to the REQ/CAT Web site.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
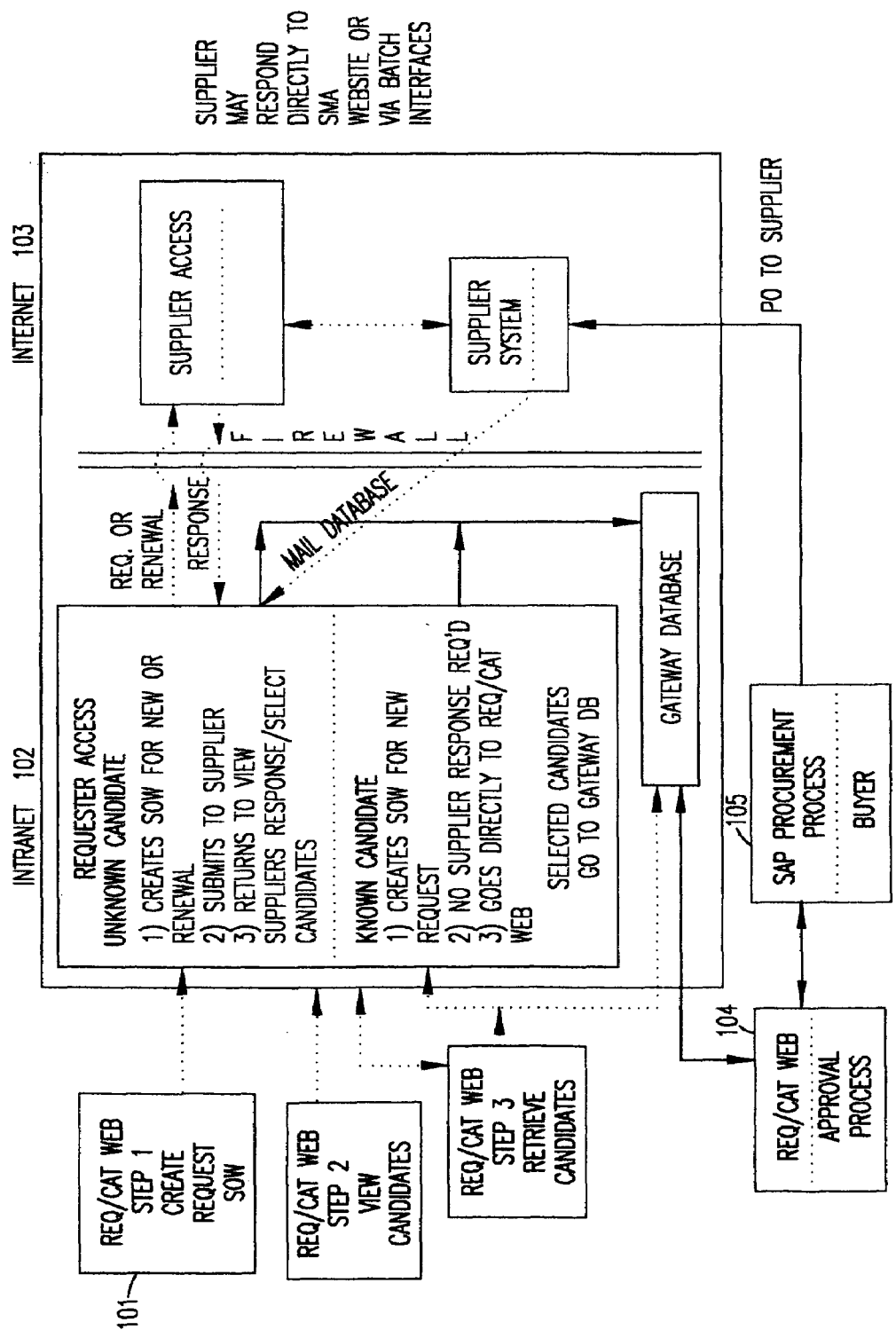
FIG. 1 is a block diagram of the architecture of the technical services skills matching application according to the invention.

Referring now to the drawings, and more particularly to FIG. 1, there is shown the architecture of the Skills Matching Application (SMA). A user of the system (the requester) accesses requisition/catalog (REQ/CAT) Web site 101 and uses an internal REQ/CAT application running on an intranet to generate a request for technical services. The entry point to the SMA internal intranet site application 102 is via the REQ/CAT Web (RCW) application. The requestor would log in to the REQ/CAT Web site and select the Technical Services Catalog. The requester is directed to the SMA via the RCW application. After requiring a password and profile (for first time access), the SMA application takes the requestor through a series of screens which asks them to complete a statement of work (SOW) and complete a skills detail checklist for each of the technical skills they are requesting. Some of the information required to be entered at the following:

a) type and skill required, i.e., programmer, network specialist, database administrator, etc.;
b) level of the skill;
c) proficiency level of specific operating systems, programming languages and tools required of the candidate;
d) work location, on-call, weekend work, experience required for position, etc.;
e) other related SOW information; and
f) file attachments can also be included.

The requester then provides the details of the technical requirement and submits this request either to the suppliers or back to the requisition system RCW.

As shown in FIG. 1, the requester can access an unknown candidate or a known candidate. In the more typical scenario, the requester accesses an unknown candidate, creating the SOW in response to the screens presented by the SMA application. Once the request is completed, it is submitted to contracted suppliers via e-mail notification. Individual contracted suppliers versus all contracted suppliers can be identified by the requester. The SMA external Internet site 103 is accessed by the suppliers when they receive the e-mail notification. This e-mail notification to the suppliers notifies the suppliers that a new request has been entered into the SMA application for them to review and submit a candidate(s) against. This e-mail has a standard formatted attachment that contains the SOW and skills detail checklist.

The SMA application has the capability to identify suppliers as primary, secondary, tertiary, etc., for each skill. The SMA application will send the request immediately to the primary and after a predetermined number of days to the secondary, and so on. The number of days between e-mail notifications are variables which can be changed by the SMA application administrator. The requester can cancel the request at any time, in which case and e-mail is sent to all suppliers who were previously sent a notification of the request. In general, e-mail notifications are sent to suppliers when the requester performs any action against the request and vice versa.

The suppliers then access the Web site database to view the request details. Suppliers can also use the e-mail notifications and attachments to load directly into their local systems. Each supplier can access the SMA Web site 103 to respond to the request or respond directly. A supplier reviews the requirements and then submits candidates back to the requester. The supplier provides a candidate(s) by accessing the SMA Web site, submitting candidate(s) and appending a resume(s) as appropriate or directly from the supplier internal system.

Figure 2:
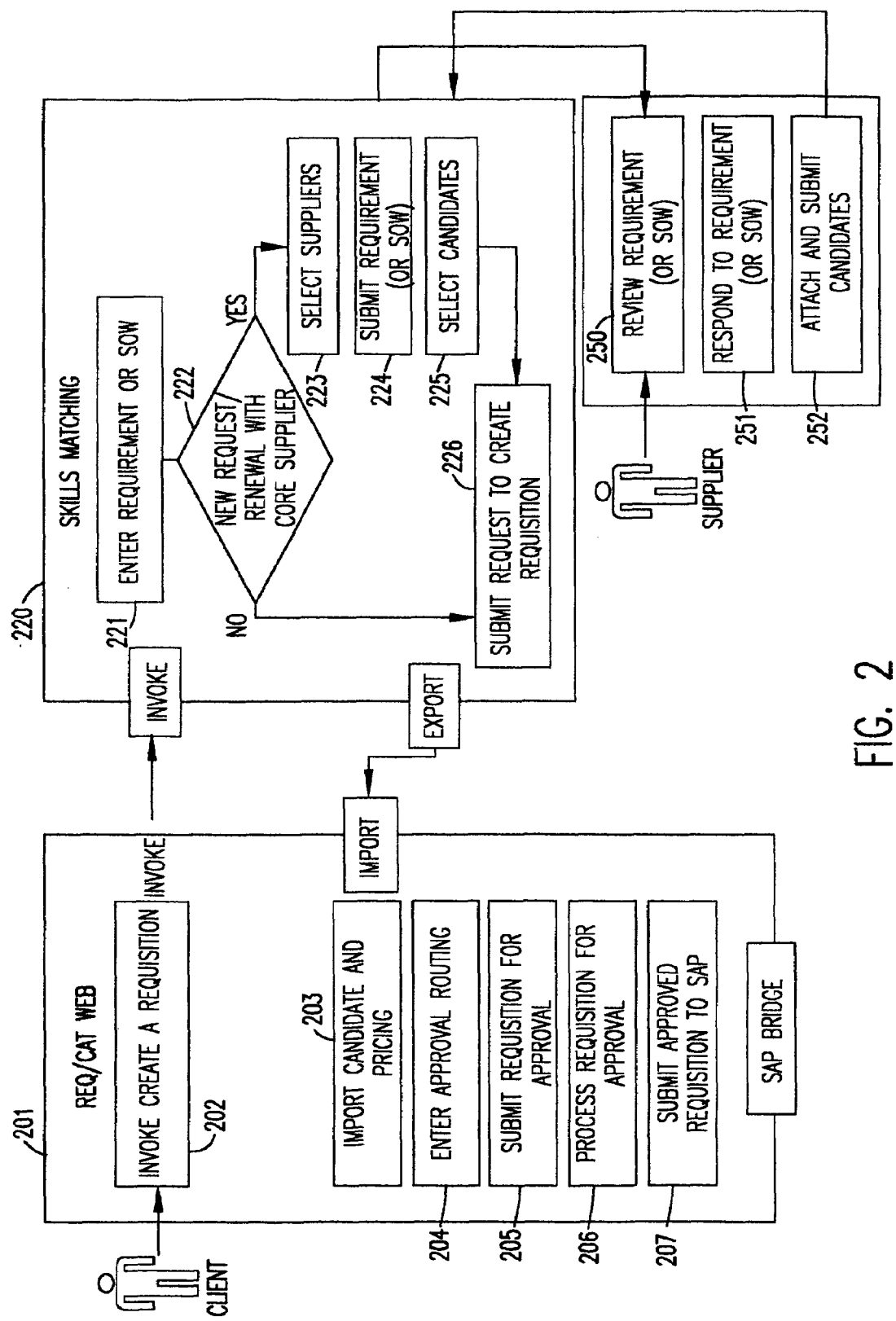
FIG. 2 is a block diagram showing the data flow of the technical services skills matching process.

The requester views the supplier responses and associated resumes. The requester can either accept or reject each candidate submitted, but cannot accept more than the number of candidates requested. The RCW/CAT approval process in block 104 is invoked when a candidate has been selected for an assignment and the requester management approval process is started to complete the requisition. Block 105 represents the "SAP Procurement Process". SAP is the system that completes the requisition process and transmits the Purchase Order (PO) to the supplier for billing and payment. The linkage with the REQ/CAT Web application and the supplier is shown in more detail in FIG. 2. The requester (client) accesses the REQ/CAT Web 201 and invokes the REQ/CAT Web application at 202 to create a requisition. This process invokes the Skills Matching Application (SMA) 220 which prompts the requester to enter requirements or SOW at function block 221. A determination is made in decision block 222 as to whether this is new request or renewal with a core supplier. If so, the requester is prompted to select suppliers in function block 223. The requester is next prompted to submit requirements (or SOW) in block 224. This information is then passed to the supplier via the Internet after e-mail notification. In function block 250, the supplier reviews the requirements (or SOW). A response is made in function block 251. The supplier attaches the resume(s) and submits candidate(s) in function block 252 with the response. The requester views the candidates submitted and selects candidate(s) in function block 225. A request to create a requisition is submitted by the requestor in function block 226, and this request is exported to the REQ/CAT Web application. The REQ/CAT Web application imports candidate and pricing in function block 203, and enters approval routing in function block 204. The request is submitted for approval in function block 205. A submitted request is processed for approval in function block 206. Once approved, the request is submitted to the SAP procurement system in function block 207.

In addition to the process described above, the SMA supports two other processes. The first of these is the submission of a request to a specific supplier. This is the situation mentioned above in the description of FIG. 1 where the candidate is known (either a new request or a renewal). This process is used to renew or request a technical subcontractor from a core supplier who in some circumstances may already be working for the requester and needs to be extended or a technical subcontractor who, having previously worked for the requester, is someone the requester specifically wants for a new job. Known candidate requests are sent to that supplier who is already providing the candidate. The other process is a request to the REQ/CAT application for a known candidate and a known rate to be charged. These requests are not sent to the supplier who is providing the candidate, but are simply completed and sent directly to the REQ/CAT Web application.

While the invention has been described in terms of a single preferred embodiment, those skilled in the art will recognize that the invention can be practiced with modification within the spirit and scope of the appended claims.

The invention claimed is:

1. A Skills Matching Application (SMA) comprising:
   means for invoking the SMA from a Requisition/Catalog (REQ/CAT) application, said REQ/CAT application being able to requisition technical services from a catalog of contracted suppliers;

means for a user to enter a services request into the SMA, the services request further comprising a Statement of Work (SOW) and a skills detail checklist for each of the technical skills needed to perform said services request;

means for the SMA to identify contracted suppliers for each of said technical skills needed to perform said services request and to assign a priority to the identified suppliers based on said technical skills;

means for notifying the identified contracted suppliers in sequence based upon said SMA assigned priority that said services request has been entered into the SMA application;

means for said notified suppliers to retrieve and review said services request using the SMA application;

means for receiving at the SMA from a notified supplier a submission identifying a candidate or candidates having the technical skills required to perform said services request;

means for notifying the user that a submission in response to said services request has been received at the SMA from one of said identified suppliers and displaying for the user the response submitted by said supplier; and means for the SMA to notify all said notified suppliers when the user acts upon the services request.

2. The Skills Matching Application of claim 1, wherein the SMA and REQ/CAT applications are Web-based and an SMA Web site is provided for suppliers to access to view request details and submit a candidate or candidates.

3. The Skills Matching Application of claim 1, further comprising means for responding to a user's selection of a candidate or candidates by invoking an approval and procurement process running on a computer system.

4. The Skills Matching Application of claim 1, wherein the identifying means identifies a supplier having earlier performed for the user the same or a similar services request.

5. The Skills Matching Application of claim 4, wherein the submission by the notified supplier identifies a candidate currently performing the same or a similar services request.

6. A computer system running Skills Matching Application (SMA) which allows a user to communicate requirements to technical service suppliers in a way that significantly reduces the process time and improves the accuracy of requests Sent to suppliers comprising:

means for accessing the SMA from a Requisition/Catalog (REQ/CAT) application also running on the computer system, said REQ/CAT application being able to requisition technical services from a catalog of contracted suppliers;

a display system for a user to enter a services request into the SMA, the services request further comprising a Statement of Work (SOW) and a skills detail checklist for each of the technical skills needed to perform said services request;

means for the SMA to identify contracted suppliers for each of said technical skills needed to perform said services request and to assign a priority to the identified suppliers based on said technical skills;

transmitting means for notifying said identified contracted suppliers in sequence based upon said SMA assigned priority that said services request has been entered into the SMA application for them to review and submit a candidate against;

means for retrieving and reviewing said services request in response to said notification; and receiving means for receiving at said display system, from a notified supplier, a submission identifying a candidate or candidates having the technical skills needed to perform said services request; and means for the SMA to notify all said notified suppliers when the user acts upon the services request.

7. The computer system of claim 6, wherein the SMA and REQ/CAT applications are Web-based and an SMA Web site running on the computer system is provided for suppliers to access to view request details and submit a candidate or candidates.

8. The computer system of claim 6, further comprising means for responding to a user's selection of a candidate or candidates by invoking an approval and procurement process running on said computer system.

9. A method for engaging technical service suppliers, comprising:

prompting a user to enter a services request into a Skills Matching Application (SMA), the services request further comprising a Statement of Work (SOW) and a skills detail checklist for each of the technical skills needed to perform said services request;

identifying by the SMA suppliers for each of the needed technical skills;

assigning by the SMA a priority to the identified suppliers based on said needed technical skills;

notifying the identified suppliers in sequence based upon said SMA assigned priority that said services request has been entered into the SMA;

receiving at the SMA from a notified supplier a submission identifying a candidate or candidates having the technical skills needed to perform said services request;

notifying the user that a submission in response to said services request has been received at the SMA; and notifying all notified suppliers when the user acts upon the services request.

10. A method as in claim 9, wherein the user acts upon the services request by accepting a candidate identified by a supplier.

11. A method as in claim 10, wherein electronic mail is used to notify all other notified suppliers that said services request is closed.

12. A method as in claim 9, wherein in said assigning step the SMA identifies primary suppliers and secondary suppliers, and wherein said secondary suppliers are notified a pre-determined time after said primary suppliers are notified.

13. A method as in claim 9, wherein the user acts upon the services request by withdrawing the services request.

14. A method as in claim 9, wherein said supplier submission includes a resume of an identified candidate.

15. A method as in claim 10, further comprising invoking a process for approval and procurement of the candidate accepted by the user.

16. A method as in claim 9, wherein the user accesses the SMA from a Requisition/Catalog (REQ/CAT) application.

17. A method as in claim 16, wherein the SMA and REQ/CAT applications are Web based and an SMA Web site is provided for notified suppliers to view service request details and submit a candidate or candidates.

18. A method as in claim 10, further comprising invoking a process for approval and procurement of the candidate accepted by the user, prior to notifying suppliers that the request is closed.

* * * * *